United States Patent [19]
Lee et al.

[11] Patent Number: 4,877,758
[45] Date of Patent: Oct. 31, 1989

[54] LEAD-FREE FRIT

[75] Inventors: Paul R. Lee, Hilliard; Joseph P. Hingsbergen, Delaware, both of Ohio

[73] Assignee: Chi-Vit Corporation, Urbana, Ohio

[21] Appl. No.: 288,783

[22] Filed: Dec. 22, 1988

[51] Int. Cl.$^4$ .......................... C03C 8/08; C03C 8/04; C03C 3/097; C03C 3/068
[52] U.S. Cl. ...................................... 501/24; 501/26; 501/63; 501/78; 501/79
[58] Field of Search ....................... 501/24, 26, 63, 78, 501/79

[56] References Cited

U.S. PATENT DOCUMENTS

| | | | |
|---|---|---|---|
| 2,660,531 | 11/1953 | Fraser et al. | 106/48 |
| 2,827,393 | 3/1958 | Kadisch et al. | 117/65 |
| 2,890,964 | 6/1959 | Commons, Jr. et al. | 106/48 |
| 2,925,351 | 2/1960 | Judd | 106/48 |
| 3,017,279 | 1/1962 | Van Dolah et al. | 106/48 |
| 3,383,225 | 5/1968 | Stradley | 106/48 |
| 3,463,646 | 8/1969 | Little et al. | 106/48 |
| 3,927,243 | 12/1975 | Theisen | 428/433 |
| 4,256,497 | 3/1981 | Knapp | 106/48 |
| 4,285,731 | 8/1981 | Nigrin | 106/48 |
| 4,312,051 | 1/1982 | Eppler | 501/24 |
| 4,316,963 | 2/1982 | Hommel et al. | 501/14 |
| 4,361,654 | 11/1982 | Ohmura et al. | 501/24 |
| 4,469,798 | 9/1984 | Nishino et al. | 501/14 |
| 4,554,258 | 11/1985 | Francel | 501/21 |
| 4,590,171 | 5/1986 | Nigrin | 501/25 |

FOREIGN PATENT DOCUMENTS 661421 4/1963 Canada .................................. 501/24

Primary Examiner—William R. Dixon, Jr.
Assistant Examiner—Deborah Jones
Attorney, Agent, or Firm—Wood, Herron & Evans

[57] ABSTRACT

A lead-free frit suitable for use on aluminum, consisting essentially of:

| | |
|---|---|
| 33–42 wt. % | $SiO_2$ |
| 8–13 | $TiO_2$ |
| 0.5–2.5 | $SnO_2$ |
| 0.5–2.5 | $BaO$ |
| 2.5–5.0 in the absence of $Ce_2O_3$; 0–4.5 if $Ce_2O_3$ is present. | $SrO$ |
| 2.2–4.3 | $ZnO$ |
| 13–26 | $Na_2O$ |
| 4–9 | $K_2O$ |
| 0.7–6.0 | $Li_2O$ |
| 0.5–4.5 | $B_2O_3$ |
| 1.0–3.5 | $Sb_2O_3$ |
| 0–0.8 | $Ce_2O_3$ |
| 0.5–5.0 | $P_2O_5$ |
| 0.2–1.3 | $MoO_3$ |

The frit has a fusion temperature below about 1050° F. and displays good qualities of gloss, acid resistance, and adhesion.

5 Claims, No Drawings

LEAD-FREE FRIT

FIELD OF THE INVENTION

This invention relates to an enamel frit which is especially useful for application to cooking and eating utensils made of aluminum or aluminum based alloys.

BACKGROUND OF THE INVENTION

Frits which are used to form enamel coatings on underlying surfaces of iron or steel usually have fusing temperatures which are above about 1460° F. Those frits generally cannot be used on aluminum, which has a melting temperature of about 1217° F., well below that of such frits. (The common aluminum alloys melt at temperatures that are slightly higher than unalloyed aluminum but still substantially below the melting point of such frits.) In order to be fusible on a surface utensil of aluminum or its alloys, a frit must, among other criteria, have a fusing temperature no higher than about 1050° F. In order to formulate such a frit, lead oxide was once included as a component of the frit; it acted as a flux and lowered the fusing temperature. However, it is now well known that even very small quantities of lead (or lead oxide) in a frit can be toxic, where the frit is on a utensil which comes into contact with food. In use of the utensil the lead oxide will gradually be dissolved from the enamel and may appear in food or liquid heated or served in the utensil. It therefore has become desirable to avoid the use of all lead oxide in frits to be applied to eating or cooling utensils.

One substitute for lead oxide, as a means of reducing the fusing point of a frit, was bismuth oxide. Bismuth is not itself toxic; however, it was found that virtually all large volume, low cost, sources of bismuth oxide contained small proportions of lead oxide as a trace impurity which was carried over into the frit. Even if lead oxide is only present in an amount greater than 5 ppm, it is potentially harmful. Thus it has not been practical to provide a frit suitable for use on aluminum by using bismuth oxide; effective amounts of it tend to carry more than about 5 ppm lead into the enamel.

The elimination of lead and bismuth oxides as fluxes for producing low melting frits has made it difficult to discover a frit which has an adequate overall combination of the necessary properties. In addition to having a fusing temperature below about 1050° F., a frit for use on aluminum must also have adequate chemical durability, which is generally characterized as acid resistance. Further, it must have good adherence to the underlying base, whether a casting, extrusion or sheet aluminum; it must have good spall resistance; it must be capable of accepting coloring agents and pigments to yield a range of opaque colors from very dark to pastels; and after firing it must display a reflectance and a specular gloss which are adequate to meet aesthetic requirements.

It has proven unusually difficult to discover a frit which meets these requirements while at the same time avoiding the use of essentially all lead and other toxic heavy metal oxides.

THE PRIOR ART

Fraser et al U.S. Pat. No. 2,660,531 shows a lead-free, fluorine-free frit for aluminum, but contains high proportions of RO oxides and aluminum oxide. Kadish et al U.S. Pat. No. 2,827,393 teaches a lead-free enamel for use on aluminum, but requires high BaO, $B_2O_3$, and low $SiO_2$.

Commons et al U.S. Pat. No. 2,890,964 requires fluorine and zirconia, and utilizes high $B_2O_3$ and $TiO_2$. Judd U.S. Pat. No. 2,925,351 shows a lead-free frit for aluminum which has a very low content of RO oxides and high $Sb_2O_5$ content. Van Dolah et al U.S. Pat. No. 3,017,279 focuses on the use of cupric oxide and gold for color stability, in a wide range of frits.

Stradely U.S. Pat. No. 3,383,225 is directed to an acid resistant frit for aluminum which contains no $MoO_3$ or SrO.

Little et al U.S. Pat. Nos. 3,458,344 and 3,463,646 teach frits for use on steel, and which require high $P_2O_5$ $B_2O_3$, and a low ratio between their proportions.

Theisen U.S. Pat. No. 3,927,243 is specifically directed to a no-lead aluminum enamel which utilizes bismuth oxide in combination with $TiO_2$, and indicates that the frit should not contain ZnO, BaO, or SrO.

Knapp U.S. Pat. No. 4,256,497 shows a lead-free frit which is used for coating alumina rather than aluminum, and which is high melting. Nigrin U.S. Pat. No. 4,282,035 shows a frit which contains high $SiO_2$, $ZrO_2$, $Al_2O_3$, and relatively low alkali. Another Nigrin patent, No. 4,285,731, shows a lead-free frit for glass and glass ceramics, which uses high $B_2O_3$, BaO, and $ZrO_2$.

Eppler U.S. Pat. No. 4,312,951 is directed to a low melting lead-free ceramic which requires both alumina and fluorine.

Hommel et al U.S. Pat. No. 4,316,963 focuses on a leadless glaze composition which is made with a molybdenate, but which also requires alumina.

No. 4,361,654 teaches the use of $MoO_3$, and requires relatively high $B_2O_3$, and has a high fusion point as a result of the inclusion of several high melting metal oxides.

No. 4,469,798 concerns a no-lead, low melting frit which uses high $B_2O_3$ fluorine, $ZrO_2$, and low soda. Francel U.S. Pat. No. 4,554,258 teaches a lead-free frit with a very high bismuth content.

Nigrin patent No. 4,590,171 teaches a frit which is especially suitable for contact with foods and food service applications but differs from the present frit in calling for low soda, more BaO, much more $B_2O_3$, alumina, higher silica, zirconia, and fluorine.

West German patent document No. 1,091,831, teaches a lead-free aluminum frit, but the frit has poor acid resistance.

BRIEF DESCRIPTION OF THE INVENTION

In accordance with this invention a frit is provided which, on an oxide basis as melted, is comprised essentially of the following components:

| $RO_2$ | Broad Range, Wt. % | Preferred Composition |
|---|---|---|
| $SiO_2$ | 33–42 | 37.0 |
| $TiO_2$ | 8–13 | 12.2 |
| $SnO_2$ | 0.5–2.5 | 1.4 |
| RO | | |
| BaO | 0.5–2.5 | 1.0 |
| SrO | 2.5–5.0 in the absence of $Ce_2O_3$; 0–4.5 if $CeO_3$ is present. | 3.0 |
| ZnO | 2.2–4.3 | 3.4 |
| $R_2O$ | | |
| $Na_2O$ | 13–26 | 22.0 |
| $K_2O$ | 4–9 | 6.8 |

-continued

| | | |
|---|---|---|
| Li$_2$O | 0.7–6.0 | 4.3 |
| R$_2$O$_3$ | | |
| B$_2$O$_3$ | 0.5–4.5 | 1.9 |
| Sb$_2$O$_3$ | 1.0–3.5 | 2.3 |
| Ce$_2$O$_3$ | 0–0.8 | 0 |
| P$_2$O$_5$ | 0.5–5.0 | 4.3 |
| MoO$_3$ | 0.2–1.0 | 0.5 |
| | | 100.1 |

In addition, Fe$_2$O$_3$ or Cr$_2$O$_3$ may be present as an impurity, or may be added for coloring purposes in small amounts:

| | |
|---|---|
| Fe$_2$O$_3$ | 0–0.3 |
| Cr$_2$O$_3$ | 0–0.2 |

Essentially no PbO or CdO should be present (as used in reference to these components, 'essentially no' means less than about 5 ppm). Al$_2$O$_3$, F$_2$, and ZrO$_2$ are also undesirable and should not be added, although such small proportions of them are not seriously harmful.

The total R$_2$O preferably should not exceed 35% of the total, and the total RO$_2$ should be at least 42%.

Experimental testing has established the importance of the approximate ranges recited for the individual oxides. The desired properties are obtained as a balance in a series of compromises that affect fusing point, acid resistance, fluidity, gloss, texture or smoothness, opacity and color. A component which improves one property (e.g., which lowers melting point) often adversely affects another. For example, we have found that adding Na$_2$O lowers the melting point but hurts acid resistance, whereas adding silica improves acid resistance but raises the melting point. TiO$_2$ raises the melting point but lowers the gloss. SnO$_2$ improves opacity, but makes the frit more refractory. BaO reduces the melting point but hurts acid resistance, texture, and smoothness. SrO increases the fluidity of the melted frit, but raises its fusion point; ZnO also increases fluidity and raises the melting point; moreover, it tends to make the frit refractory and reduces its acid resistance. Changes in K$_2$O content have affects similar to those of changes in Na$_2$O, but it is more expensive. Li$_2$O lowers the melting point and does not hurt acid resistance as much as potassium or soda, but is more expensive still. B$_2$O$_3$ lowers the melting point, but is detrimental to acid resistance and also lowers viscosity. Sb$_2$O$_3$ functions as an opacifier; reducing the amount of it lowers the fusing point. Ce$_2$O$_3$ is optional but can be present; apparently it acts as a flux and it can to some extent reduce the needed SrO content. The addition of Ce$_2$O$_3$ lowers the gloss slightly and makes the material more refractory. P$_2$O$_5$ acts as a glass former; increasing the amount of it tends to impair the acid resistance and decrease the viscosity of the glass. MoO$_3$ is required in small but important amount; it acts as an adhesion promoter and a flux.

Apart from the ingredients noted above, certain ingredients are important by their absence. PbO and CdO are undesirable in amounts more than about 5 ppm, because of their toxicity. The flux should contain no significant amount of aluminum or zirconia, both of which are refractory and raise the fusing point. Any significant amount of fluorine is unacceptable in the frit formulation because it tends to react with the underlying aluminum metal and cause blistering and spalling.

DETAILED DESCRIPTION

Table I illustrates a number of examples of frits in accordance with the invention. (In the following tables, each frit is expressed in terms of the percentages by weight of its oxide components, as melted.)

TABLE I

| | FRIT COMPOSITIONS | | | | | | | |
|---|---|---|---|---|---|---|---|---|
| Oxide, | Frit Nos. | | | | | | | |
| wt. % | 1 | 2 | 3 | 4 | 5 | 6 | 7 | 8 |
| SiO$_2$ | 36.96 | 36.64 | 37.72 | 36.05 | 36.60 | 37.46 | 36.16 | 36.51 |
| TiO$_2$ | 12.20 | 12.09 | 12.49 | 11.90 | 12.08 | 12.33 | 11.96 | 12.07 |
| SnO$_2$ | 1.40 | 1.40 | 1.44 | 1.34 | 1.40 | 1.40 | 1.35 | 1.40 |
| BaO | 1.01 | 1.01 | 1.04 | 0.97 | 1.01 | 1.01 | 0.98 | 1.01 |
| SrO | 2.95 | 2.91 | — | 2.86 | 2.90 | 2.99 | 2.89 | 2.90 |
| ZnO | 3.38 | 3.38 | 3.46 | 3.32 | 4.26 | 2.22 | 3.29 | 3.32 |
| Na$_2$O | 22.00 | 21.83 | 22.52 | 21.45 | 21.81 | 22.27 | 21.52 | 21.76 |
| K$_2$O | 6.77 | 6.74 | 6.90 | 6.58 | 6.73 | 6.86 | 8.84 | 6.65 |
| Li$_2$O | 4.33 | 4.29 | 4.42 | 4.22 | 4.29 | 4.38 | 4.23 | 4.28 |
| B$_2$O$_3$ | 1.88 | 1.88 | 1.94 | 4.36 | 1.88 | 1.88 | 1.82 | 1.84 |
| Sb$_2$O$_3$ | 2.29 | 2.24 | 2.33 | 2.23 | 2.24 | 2.30 | 2.26 | 3.46 |
| Ce$_2$O$_3$ | — | 0.79 | 0.79 | — | — | — | — | — |
| P$_2$O$_5$ | 4.28 | 4.25 | 4.39 | 4.18 | 4.25 | 4.35 | 4.19 | 4.25 |
| MoO$_3$ | 0.54 | 0.54 | 0.53 | 0.54 | 0.54 | 0.54 | 0.49 | 0.54 |
| Total RO$_2$ | 50.56 | 50.13 | 51.65 | 49.29 | 50.08 | 51.19 | 49.47 | 49.98 |
| Total RO | 7.34 | 7.30 | 4.50 | 7.15 | 8.17 | 6.22 | 7.16 | 7.23 |
| Total R$_2$O | 33.10 | 32.86 | 33.84 | 32.25 | 32.83 | 33.51 | 34.59 | 32.69 |

Frit No. 1 is the presently preferred frit. As can be seen, it contains no lead, cadmium, bismuth, alumina, zirconia, or fluorine. The frit is compounded and melted in accordance with conventional techniques from the standard raw materials. It has a fusion temperature of about 1000° F. The material is applied as a water slip.

An enamel coating formed from frit in accordance with Frit No. 1 has a 'Class A' acid resistance, as measured according to ASTM Citric Acid Spot Test Procedure C282-67. (In this test the fired surface is exposed to 10% citric acid for 15 minutes at room temperature. The surface change is observed and evaluated according to the relative degree of etching.) The frit was opaque white and its adhesion was excellent. (Adhesion is measured by testing the spall resistance of the enamel in accordance with the Porcelain Enamel Institute Technical Bulletin T-51, 'Antimony Trichloride Spall Test For Porcelain Enameled Aluminum.' That test requires exposure of the enamel surface of a 1% solution of antimony trichloride, for 20 hours.) The frit had a smooth surface texture and was glossy when fired at 1000° F., 970° F. (low temperature firing), or 1030° F. (high temperature firing). (Gloss is evaluated over a range of firing temperatures because the actual temperature of conventional commercial furnaces often deviates slightly from the set point; moreover, relatively cold spots and hot spots normally exit in some areas of any given furnace. To be satisfactory for use on aluminum a frit must display satisfactory gloss over a firing range of about 970-1030° F.) The other characteristics were evaluated in the conventional manner used for evaluation of porcelain enamel surfaces.

Frit No. 2 was basically similar to Frit No. 1 but contained approximately 0.8% of cerium oxide. This gave slightly lower gloss when fired at 970° F., and the acid resistance was somewhat lower, but overall the frit was acceptable.

Frit No. 3 was basically similar to Frit No. 1, but contained 0.8% CeO3 and no SrO. This caused no apparent difference from the preferred frit.

Frit No. 4 was similar to No 1 but with approximately 2.5% more B2O3. This slightly lowered the gloss at 970° F. and somewhat lowered acid resistance.

Frit No. 5 was basically similar to No. 1 but contained approximately 1% more zinc oxide. The additional zinc oxide somewhat impaired acid resistance.

Frit No. 6 was basically similar to Frit No. 1 but contained about 1.2% less zinc oxide than the former. This frit gave substantially the same results as No. 1.

Frit No. 7 was basically similar to No. 1 but contained about 2% more K2O. The fired enamel did not visibly differ from that of Frit No. 1.

Frit No. 8 was like Frit No. 1 but contained 1.2% more antimony oxide. This reduced the gloss if fired at 970° F. but improved acid resistance.

Table II shows a number of frits which were outside the scope of the invention by reason of giving unacceptably poor overall properties after firing.

over, the enamel had no gloss; it did not fire out on the test plate at the temperatures used.

Frit No. 13 was similar to No. 1, but contained no molybdenum oxide. This reduced the acid resistance, moreover it reduced gloss when fired at 970°.

Frit No. 14 was similar to No. 1, but contained no P2O5. This drastically reduced the acid resistance, and it reduced gloss when fired at 970° F.

Frit No. 15 was similar to Frit No. 1, but it contained no antimony oxide. This caused spalling at the edges of the samples, reduced gloss when fired at 1030° F. ('high temperature firing'), and hurt the acid resistance.

Frit No. 16 was similar to No. 1, but contained about 1.9% of aluminum oxide. This seriously reduced the acid resistance and reduced gloss when fired at 970° F.

Frit No. 17 was similar to No. 1, but it contained about 2% fluorine. The enamel formed by this frit spalled severely, had lower acid resistance, and lost gloss when fired at 1030° F.

Frit No. 18 was similar to No. 1 but it contained approximately 2.0% more TiO2 and 2.0% less SiO2.

TABLE II

| Oxide, Wt. % | 9 | 10 | 11 | 12 | 13 | 14 | 15 | 16 | 17 | 18 |
|---|---|---|---|---|---|---|---|---|---|---|
| SiO2 | 38.10 | 38.29 | 37.49 | 38.55 | 37.33 | 38.70 | 37.80 | 36.32 | 36.12 | 34.94 |
| TiO2 | 12.60 | 12.63 | 12.39 | 12.79 | 12.29 | 12.79 | 12.51 | 11.95 | 11.99 | 14.22 |
| SnO2 | 1.44 | 1.46 | — | 1.48 | 1.40 | 1.46 | 1.46 | 1.35 | 1.38 | 1.40 |
| ZrO2 | — | — | — | — | — | — | — | — | — | — |
| BaO | 1.04 | 1.06 | 1.01 | 1.07 | 1.01 | 1.06 | 1.01 | 0.98 | 1.00 | 1.01 |
| SrO | — | 2.96 | 2.91 | 3.08 | 2.98 | 3.07 | 3.03 | 2.89 | 2.91 | 2.95 |
| ZnO | 3.46 | — | 3.44 | 3.56 | 3.43 | 3.55 | 3.44 | 3.35 | 3.34 | 3.38 |
| Na2O | 22.68 | 22.80 | 22.34 | 22.99 | 22.12 | 22.99 | 22.52 | 21.57 | 21.58 | 22.00 |
| K2O | 6.97 | 7.02 | 6.89 | 7.09 | 6.80 | 7.08 | 6.94 | 6.63 | 6.64 | 6.77 |
| Li2O | 4.46 | 4.48 | 4.40 | — | 4.17 | 4.33 | 4.43 | 4.24 | 4.24 | 4.33 |
| B2O3 | 1.94 | 1.96 | 1.88 | 1.99 | 1.88 | 1.96 | 1.92 | 1.86 | 1.86 | 1.88 |
| Sb2O3 | 2.33 | 2.36 | 2.35 | 2.38 | 2.29 | 2.41 | — | 2.20 | 2.21 | 2.29 |
| Ce2O3 | — | — | — | — | — | — | — | — | — | — |
| Al2O3 | — | — | — | — | — | — | — | 1.92 | — | — |
| P2O5 | 4.42 | 4.44 | 4.35 | 4.47 | 4.30 | — | 4.38 | 4.19 | 4.20 | 4.28 |
| MoO3 | 0.53 | 0.54 | 0.54 | 0.55 | — | 0.59 | 0.54 | 0.54 | 0.53 | 0.54 |
| F2 | — | — | — | — | — | — | — | — | 1.99 | — |

| Oxide Wt. % | 19 | 20 | 21 | 22 | 23 | 24 | 25 | 26 | 27 |
|---|---|---|---|---|---|---|---|---|---|
| SiO2 | 36.30 | 37.71 | 36.61 | 35.24 | 36.34 | 39.99 | 35.17 | 37.16 | 36.51 |
| TiO2 | 12.01 | 12.43 | 12.14 | 11.61 | 11.95 | 13.23 | 11.66 | 12.32 | 12.04 |
| SnO2 | 3.07 | 1.40 | 1.40 | 1.34 | 1.34 | 1.50 | 1.34 | 1.40 | 1.39 |
| ZrO2 | — | — | — | — | — | — | 0.95 | — | — |
| BaO | 1.01 | 1.01 | 1.01 | 0.97 | 1.01 | — | 2.87 | 0.93 | 0.92 |
| SrO | 2.90 | 2.99 | 2.90 | 2.82 | 2.90 | — | 2.83 | 2.99 | 2.92 |
| ZnO | 3.32 | 3.44 | 3.38 | 3.20 | 3.32 | — | 3.22 | 3.44 | 3.35 |
| Na2O | 21.64 | 22.47 | 21.84 | 20.95 | 21.60 | 23.80 | 20.94 | 22.17 | 21.70 |
| K2O | 6.65 | 6.89 | 6.73 | 6.46 | 6.65 | 7.31 | 6.45 | 6.81 | 6.69 |
| Li2O | 4.26 | 4.41 | 4.29 | 4.12 | 4.25 | 4.68 | 4.12 | 4.36 | 4.27 |
| B2O3 | 1.84 | — | 1.88 | 6.53 | 1.58 | 1.76 | 3.69 | 1.81 | 1.75 |
| Sb2O3 | 2.23 | 2.35 | 2.29 | 2.18 | 2.23 | 2.44 | 2.18 | 2.30 | 2.27 |
| Ce2O3 | — | — | — | — | — | — | — | — | — |
| Al2O3 | — | — | — | — | — | — | — | — | — |
| P2O5 | 4.21 | 4.37 | 4.25 | 4.09 | 6.28 | 4.70 | 4.08 | 4.31 | 4.21 |
| MoO3 | 0.54 | 0.54 | 1.27 | 0.49 | 0.54 | 0.58 | 0.49 | — | 0.48 |
| F2 | — | — | — | — | — | — | — | — | 1.47 |

Frit No. 9 was similar to No. 1, but contained no SrO. The enamel appeared glossy but displayed a low reflectance.

Frit No. 10 was simliar to No. 1, but contained no ZnO. The frit had a very poor shelf life, tending to agglomerate when stored, and the resulting enamel when fired at 970° F. had a low gloss.

Frit No. 11 was similar to No. 1, but contained no tin oxide. Acid resistance was poor.

Frit No. 12 was similar to No. 1 but contained no lithium. This seriously hurt its acid resistance. More- This hurt its acid resistance.

Frit No. 19 ws similar to No. 1, but contained approximately 1.7% more tin oxide. This reduced the gloss when fired at 970° F.

Frit No. 20 was similar to No. 1 but it contained no boron oxide. This reduced the gloss at low temperature firing (970° F.).

Frit No. 21 was similar to No. 1 but contained .73% more molybdenum oxide. This decreased the fluidity of the glass and hurt its acid resistance.

Frit No. 22 was like No. 1 but contained 4.65% more $B_2O_3$. This frit had low acid resistance.

Frit No. 23 was similar to No. 1 but had increased $P_2O_5$. The product had poor gloss when fired at low temperature.

Frit No. 24 was similar to No. 1 but with no zinc oxide, no barium oxide, and no strontium oxide. These changes raised the melting point and hurt the gloss slightly at the low firing temperature (970° F.)

Frit No. 25 was like No. 1 but contained about 1.9% more BaO. The fluidity of the glass was increased and the acid resistance was adversely affected.

Frit No. 26 was like No. 1 but without the molybdenum oxide. It has poor low temperature gloss and a poorer acid resistance.

Frit No. 27 was like No. 1 but contained about 1.5% fluorine. The gloss was lost at high firing temperatures (1030° F.), the acid resistance was poorer, and severe spalling occurred.

While the frit described herein is especially suitable for use on utensils of aluminum or its alloys because of its low fusion temperature and its freedom from toxic heavy metals, it is not restricted to such use. It is in fact quite suitable for use on higher melting metals, e.g., steel and cast iron, and is in general useful wherever it is desirable to provide an opaque, durable, adherent, glossy, chemically resistant enamel while still avoiding toxic components.

Having described the invention, what is claimed is:

1. A lead-free frit suitable for use on aluminum and its alloys, said frit consisting essentially of about:

| | |
|---|---|
| 33–42 wt. % | $SiO_2$ |
| 8–13 | $TiO_2$ |
| 0.5–2.5 | $SnO_2$ |
| 0.5–2.5 | BaO |
| 2.5–5.0 in the absence of $Ce_2O_3$; 0–4.5% if $Ce_2O_3$ is present. | SrO |
| 2.2–4.3 | ZnO |
| 13–26 | $Na_2O$ |
| 4–9 | $K_2O$ |
| 0.7–6.0 | $Li_2O$ |
| 0.5–4.5 | $B_2O_3$ |
| 1.0–3.5 | $Sb_2O_3$ |
| 0–0.8 | $Ce_2O_3$ |
| 0.5–5.0 | $P_2O_5$ |
| 0.2–1.0 | $MoO_3$ | said frit having a fusion temperature below about 1050° F.

2. The frit of claim 1, consisting essentially

| | |
|---|---|
| 37.0% | $SiO_2$ |
| 12.2 | $TiO_2$ |
| 1.4 | $SnO_2$ |
| 1.0 | BaO |
| 3.0 | SrO |
| 3.4 | ZnO |
| 22.0 | $Na_2O$ |
| 6.8 | $K_2O$ |
| 4.3 | $Li_2O$ |
| 1.9 | $B_2O_3$ |
| 2.3 | $Sb_2O_3$ |
| 4.3 | $P_2O_5$ |
| 0.5 | $MoO_3$ |

3. The frit of claim 1 or 2, containing essentially no PbO, CdO, $F_2$, $Al_2O_3$, $ZrO_2$ or $Bi_2O_3$.

4. The frit of claim 3 containing essentially no $Ce_2O_3$.

5. The frit of claim 1 or 2, further comprising, as impurity components,

| | |
|---|---|
| 0–0.2 | $Cr_2O_3$; and |
| 0–0.3 | $Fe_2O_3$. |

* * * * *